US010297371B2

(12) United States Patent
Lee

(10) Patent No.: US 10,297,371 B2
(45) Date of Patent: May 21, 2019

(54) CAPACITOR BUSHING AND MANUFACTURING METHOD THEREFOR

(71) Applicant: HYOSUNG HEAVY INDUSTRIES CORPORATION, Seoul (KR)

(72) Inventor: Dong Won Lee, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 15/576,258

(22) PCT Filed: May 26, 2016

(86) PCT No.: PCT/KR2016/005591
§ 371 (c)(1),
(2) Date: Nov. 21, 2017

(87) PCT Pub. No.: WO2016/190686
PCT Pub. Date: Dec. 1, 2016

(65) Prior Publication Data
US 2018/0144846 A1    May 24, 2018

(30) Foreign Application Priority Data
May 26, 2015    (KR) .................. 10-2015-0072854

(51) Int. Cl.
*H01B 17/28*    (2006.01)
*H01B 13/06*    (2006.01)
(Continued)

(52) U.S. Cl.
CPC ............. *H01B 13/06* (2013.01); *H01B 17/28* (2013.01); *H01B 17/583* (2013.01); *B32B 15/08* (2013.01); *B32B 2457/16* (2013.01); *C09J 163/00* (2013.01); *H01F 27/04* (2013.01)

(58) Field of Classification Search
CPC ...... H01B 13/06; H01B 17/28; H01B 17/583; H01B 17/58; H01B 17/26; H01B 17/00;
(Continued)

(56) References Cited

U.S. PATENT DOCUMENTS 3,659,033 A * 4/1972 Grimmer ............... H01B 17/28
174/15.3
3,967,051 A * 6/1976 Moore .................... H01B 17/28
174/143
(Continued)

FOREIGN PATENT DOCUMENTS

JP    58204420 A    11/1983
JP    59040417 A    3/1984
(Continued)

*Primary Examiner* — Angel R Estrada
(74) *Attorney, Agent, or Firm* — Novick, Kim & Lee, PLLC; Jae Youn Kim

(57) ABSTRACT

Disclosed is a capacitor bushing and a method of manufacturing the same. The capacitor bushing includes insulating layers (20), formed by winding insulating fibers (22) around the outer side of a central conductor (10), and conductive layers (30) between the insulating layers (20). The wefts (34) and warps (36) that constitute the conductive fibers (32) are manufactured by sequentially forming a first coating layer (38) and a second coating layer (38') on the surface of a core wire (37). The wefts (24 and 34) and the warps (26 and 36) of the insulating fibers (22) and the conductive fibers (32) extend obliquely with respect to the longitudinal direction of the central conductor (10). The wefts (24 and 34) and the warps (26 and 36) form a polygonal or circular shape. The present invention has a merit in that bubbles are prevented from being generated in the filling layers (40).

11 Claims, 4 Drawing Sheets

(51) Int. Cl.
*H01B 17/58* (2006.01)
*B32B 15/08* (2006.01)
*C09J 163/00* (2006.01)
*H01F 27/04* (2006.01)

(58) Field of Classification Search
CPC .... B32B 15/08; B32B 2457/16; C09J 163/00; H01F 27/04
USPC .......................... 174/142, 650, 152 R, 137 R
See application file for complete search history.

(56) References Cited

U.S. PATENT DOCUMENTS

| | | | | |
|---|---|---|---|---|
| 4,227,035 A | * | 10/1980 | Runnels | H01B 17/28 174/143 |
| 4,228,318 A | * | 10/1980 | Selsing | H02G 15/22 174/143 |
| 4,387,266 A | * | 6/1983 | Matthaus | H01B 17/28 174/143 |
| 4,454,373 A | * | 6/1984 | Kishida | H01B 17/36 174/143 |
| 4,500,745 A | * | 2/1985 | Miggins | H01B 17/34 174/143 |
| 8,222,526 B2 | * | 7/2012 | Bresney | H01B 17/301 174/11 BH |
| 8,455,763 B2 | * | 6/2013 | Dais | H01B 17/28 174/152 R |

FOREIGN PATENT DOCUMENTS

| | | |
|---|---|---|
| JP | 2010514395 A | 4/2010 |
| KR | 10-2012-0030984 A | 3/2012 |
| KR | 10-1430749 B1 | 8/2014 |

\* cited by examiner

CAPACITOR BUSHING AND MANUFACTURING METHOD THEREFOR

TECHNICAL FIELD

The present invention relates to a capacitor bushing and a method of manufacturing the same. More particularly, the present invention relates to a capacitor bushing manufactured by interposing conductive layers, which include conductive fibers, between insulating layers wound around a central conductor, and a method of manufacturing the same.

BACKGROUND ART

In power devices, a bushing is used for connection to an external power source (power line). The bushing includes an outer-cover insulator having a shed so as to secure a long insulating distance, and also includes a capacitor which surrounds a central conductor and in which several conductive layers are wound around an insulating paper to reduce an electric field. An epoxy resin fills the space between the insulating paper and the conductive layers so as to surround the insulating paper and the conductive layers.

Since the insulating paper is used, the epoxy resin may not fill the inside of the bushing sufficiently to reach the position of the central conductor, and since the extent of expansion and shrinkage of epoxy is different from the extent of expansion and shrinkage of the insulating paper, there is a problem in that many gaps are generated between the epoxy resin and the insulating paper during the manufacture of a capacitor bushing.

An aluminum thin film is generally used as the conductive layer. The aluminum thin film is different from the epoxy resin in the extent of expansion and shrinkage thereof, like the insulating paper, and the bonding force between the aluminum thin film and the epoxy resin is weak. Therefore, there is a problem in that moldability is poor due to shrinkage and expansion during the thermal expansion and curing of the epoxy resin.

The aluminum thin film is an element that interferes with filling of epoxy, and has a problem in that an electric field is concentrated on a sharp portion formed during cutting.

In addition, synthetic fibers are used to solve the problem in which the insulating paper disturbs sufficient filling of the epoxy resin in the bushing, and the extent of expansion and shrinkage of the synthetic fibers is different from that of the epoxy resin. In particular, the epoxy resin expands and shrinks most in the longitudinal direction of the bushing. Since wefts or warps constituting the synthetic fibers extend in the longitudinal direction of the bushing, problems according to expansion and shrinkage occur between the epoxy resin and the synthetic fibers.

In addition, the epoxy resin expands and shrinks due to heat. If bubbles are present in the epoxy resin while expanding during filling of the epoxy resin, the bubbles grow to prevent complete filling of a filling layer in the bushing.

DISCLOSURE

Technical Problem

Accordingly, the present invention has been made keeping in mind the above problems occurring in the prior art, and an object of the present invention is to minimize a difference in the relative extent of expansion and shrinkage of insulating layers, filling layers, and conductive layers constituting a capacitor bushing.

Another object of the present invention is to uniformly provide a material for forming filling layers over insulating layers and conductive layers when the filling layers are formed in the state in which the insulating layers and the conductive layers are formed.

Still another object of the present invention is to prevent the generation of bubbles in filling layers constituting a capacitor bushing.

Technical Solution

In order to accomplish the above objects, the present invention includes a central conductor having a predetermined length, insulating layers formed by winding insulating fibers around an outer side of the central conductor so that wefts and warps constituting the insulating fibers extend obliquely with respect to the longitudinal direction of the central conductor, conductive layers positioned between the insulating layers and including conductive fibers, and filling layers formed by filling spaces between the insulating layers and the central conductor, between the insulating layers, and between the insulating layers and the conductive layers with an epoxy resin.

The conductive fibers include the wefts and the warps obtained by sequentially forming a first coating layer and a second coating layer on an outer side of an insulating core wire.

The wefts and the warps of insulating fibers and the conductive fibers are woven so as to form a circular or polygonal shape.

The wefts and the warps of the insulating fibers and the conductive fibers are woven so as to form a hexagonal shape.

The epoxy resin for forming the filling layers is mixed with 0 to 50 wt % of an inorganic filler.

Silica or alumina is used as the inorganic filler.

The wefts and the warps constituting the conductive fibers are woven so as to extend obliquely with respect to the longitudinal direction of the central conductor.

According to another characteristic of the present invention, the present invention includes winding insulating fibers around an outer side of a central conductor to form insulating layers, interposing conductive fibers between the insulating layers to form conductive layers, positioning the central conductor, which has the insulating layers wound around the outer side thereof and the conductive layers interposed between the insulating layers, in a mold, injecting a material for forming filling layers while an inside of the mold is maintained in a vacuum state, thus forming the filling layers, and curing the filling layers by applying pressure and heat to the mold in the state in which injection of the material for forming the filling layers into the mold is finished in order to form the filling layers.

The conductive fibers and the insulating fibers are wound so that wefts and warps extend obliquely with respect to the longitudinal direction of the central conductor.

The material for forming the filling layers is an epoxy resin, and an inorganic filler is mixed in an amount of 0 to 50 wt %.

The method further includes cooling the filling layers after curing the filling layers.

Advantageous Effects

The following effects can be obtained in a capacitor bushing and a method of manufacturing the same according to the present invention.

In the present invention, synthetic fibers woven from wefts and warps including an insulating material are used in insulating layers wound around a central conductor, and conductive layers positioned between the insulating layers include conductive fibers woven from wefts and warps coated with a conductive material. In particular, the wefts and the warps are arranged so as to extend obliquely with respect to the longitudinal direction of the central conductor. Accordingly, when filling layers are formed using an epoxy resin, the material constituting the insulating layers and the conductive layers may expand and shrink together with thermal expansion and molding shrinkage of the epoxy resin, which enables the quality of the bushing to be uniform.

In addition, in the present invention, since both the insulating layers wound around the central conductor and the conductive layers formed between the insulating layers include the fibers woven from the wefts and the warps, when the filling layers are formed using the epoxy resin, the filling layers are uniformly formed over the insulating layers and the conductive layers as designed.

Further, in the present invention, the epoxy resin for forming the filling layers is mixed with up to 50 wt % of an inorganic filler to thus maximize an insulating property, which relatively increases the insulating performance of the bushing.

In the present invention, when filling of the epoxy resin is performed, the central conductor around which the insulating layers are formed and which is provided with the conductive layers interposed between the insulating layers is placed in a mold, filling of the epoxy resin is performed in a vacuum state, and air pressure is applied when heat is applied in order to cure the epoxy resin. Accordingly, bubbles are prevented from being generated in the filling layers.

BEST MODE

Figure 1:
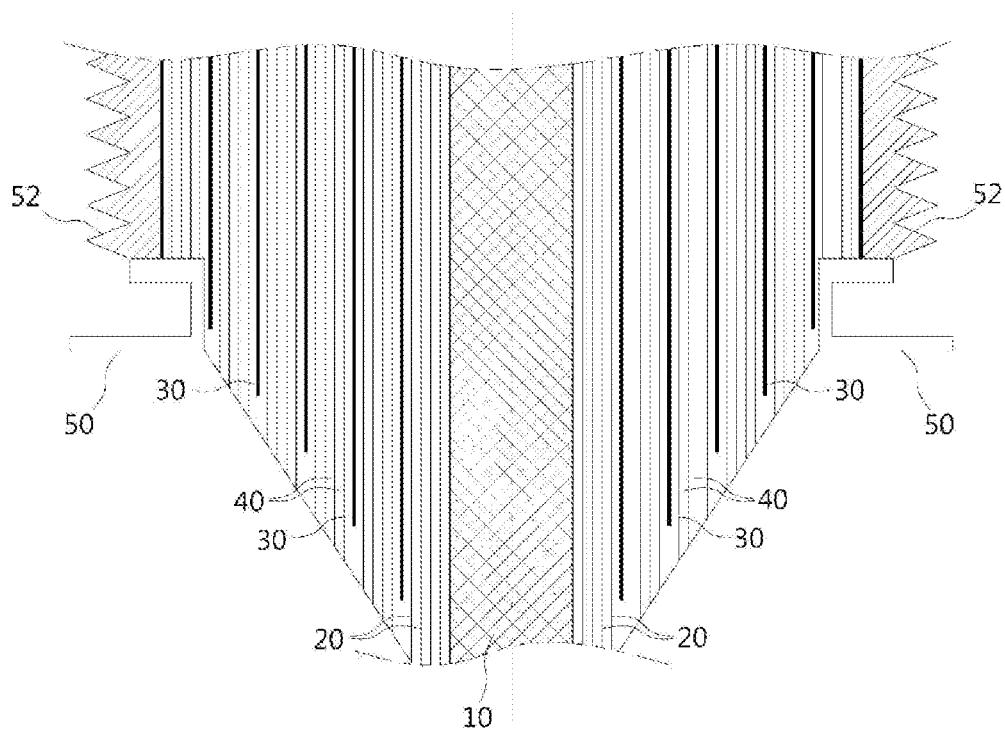
FIG. 1 is a sectional view showing the internal constitution of a capacitor bushing according to the present invention.

Hereinafter, some embodiments of the present invention will be described in detail with reference to exemplary drawings. It is to be noted that, in adding reference numerals to the constituent elements of the respective drawings, the same constituent elements are denoted by the same reference numerals whenever possible, even if they are shown in different drawings. In the following description of the embodiments of the present invention, a detailed description of known configurations or functions incorporated herein will be omitted when it is determined that the same would impede understanding of the embodiments of the present invention.

In describing the constituent elements of the embodiment of the present invention, terms such as "first", "second", "A", "B", "(a)", and "(b)" can be used. These terms are intended to distinguish the constituent elements from other constituent elements, and the terms do not limit the nature, order or sequence of the constituent elements. When a constituent element is described as being "joined", "coupled", or "connected" to another constituent element, it is to be understood that the constituent element may be directly joined or connected to the other constituent elements, and also that further constituent elements may be "joined", "coupled", or "connected" between the constituent elements.

As shown in the drawings, a central conductor 10 is present at the center of a bushing. The central conductor 10 includes a conductive material and a current flows therethrough. Insulating layers 20 are formed so as to be wound around the central conductor 10. The insulating layers 20 include insulating fibers 22, and wefts 24 and warps 26 intersect each other to thus weave the insulating fibers 22.

In the example shown in the drawings, the wefts 24 and the warps 26 form a substantially rectangular shape. The length of one side of the rectangle formed by the wefts 24 and the warps 26 must be at least 0.5 mm or more and less than 1 mm. This is because epoxy resin can pass through the rectangle only when the rectangle formed by the wefts 24 and the warps 26 has an area of more than a predetermined level. For this purpose, the length of one side of the rectangle formed by the wefts 24 and the warps 26 is set to be larger than 0.5 mm. In addition, when the length of one side of the rectangle is larger than 1 mm, the insulating performance of the insulating layers 20 is reduced. Accordingly, the length is set to be smaller than 1 mm.

The thickness of the insulating fibers 22 is preferably a value between 0.2 mm and 0.5 mm. This is because it is difficult to handle the insulating fibers 22 when the thickness is smaller than 0.2 mm and because the size of the entire bushing is increased when the thickness is larger than 0.5 mm.

Figure 2:
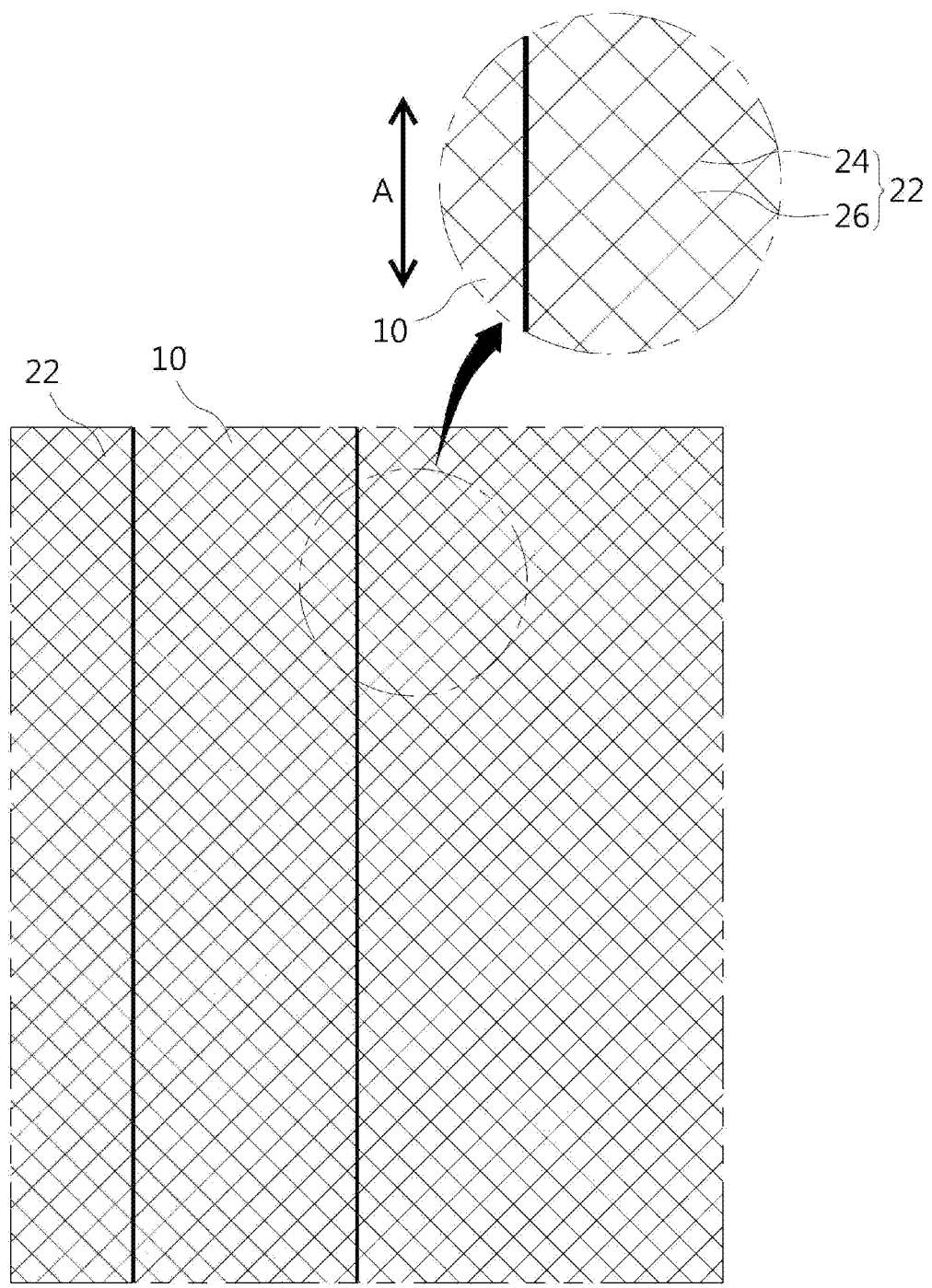
FIG. 2 is an explanatory view for showing winding of insulating fibers constituting insulating layers around a central conductor in an embodiment of the present invention.

Meanwhile, when the insulating fibers 22 are wound around the central conductor 10, both the wefts 24 and the warps 26 are inclined with respect to the longitudinal direction (the direction of arrow A) of the central conductor 10. That is, none of the wefts 24 or the warps 26 is parallel to the longitudinal direction of the central conductor 10, which is shown in FIG. 2. This is because the wefts 24 or the warps 26 do not move in the longitudinal direction of the central conductor 10 if the extension direction of any one of the wefts 24 or the warps 26 is parallel to the longitudinal direction of the central conductor 10. The reason for this is as follows. The epoxy resin to be described below expands and shrinks most in the longitudinal direction of the central conductor 10, and gaps are not generated between the insulating layers 20 and filling layers 40 only when the insulating fibers 22 expand and shrink together with the expansion and shrinkage of the epoxy resin.

With respect thereto, the wefts 24 and the warps 26 of the insulating fibers are not necessarily required to form a rectangular shape. The wefts 24 and the warps 26 may form a circular or hexagonal shape. Even when the circular or hexagonal shape is formed, if the extension direction is not parallel to the longitudinal direction of the central conductor 10, the flexibility of the insulating fibers may be almost the same as that of the epoxy resin during expansion and shrinkage of the epoxy resin. That is, even if weaving using the wefts 24 and the warps 26 is performed to form a circular or polygonal shape, any shape is feasible as long as the wefts 24 and the warps 26 are inclined with respect to the longitudinal direction of the central conductor 10. Polyester fibers or polyethylene-naphthenate fibers may be used as the insulating fibers 22.

Conductive layers 30 are positioned between the insulating layers 20. The conductive layers 30 are disposed at a predetermined distance between the insulating layers 20. The conductive layers 30 include conductive fibers 32. The constitution of the conductive fibers 32 is shown in detail in FIG. 3. Wefts 34 and warps 36 intersect each other to thus weave the conductive fibers 32 like the insulating fibers 22. The length of one side of the rectangle formed by the wefts 34 and the warps 36 of the conductive fibers 32 is between 0.5 mm and 1 mm. The reason for this is the same as that in the case of the constitution of the insulating fibers 22. For reference, when the length of one side is 1 mm or more, the conductive performance may be reduced. In the case of the conductive fibers 32 for forming the conductive layers 30, the wefts 34 and the warps 36 may form a circular or hexagonal shape in addition to a rectangular shape. That is, when the wefts 34 and the warps 36 extend obliquely with respect to the longitudinal direction of the central conductor 10, they may form various shapes, such as polygonal shapes.

Figure 3:
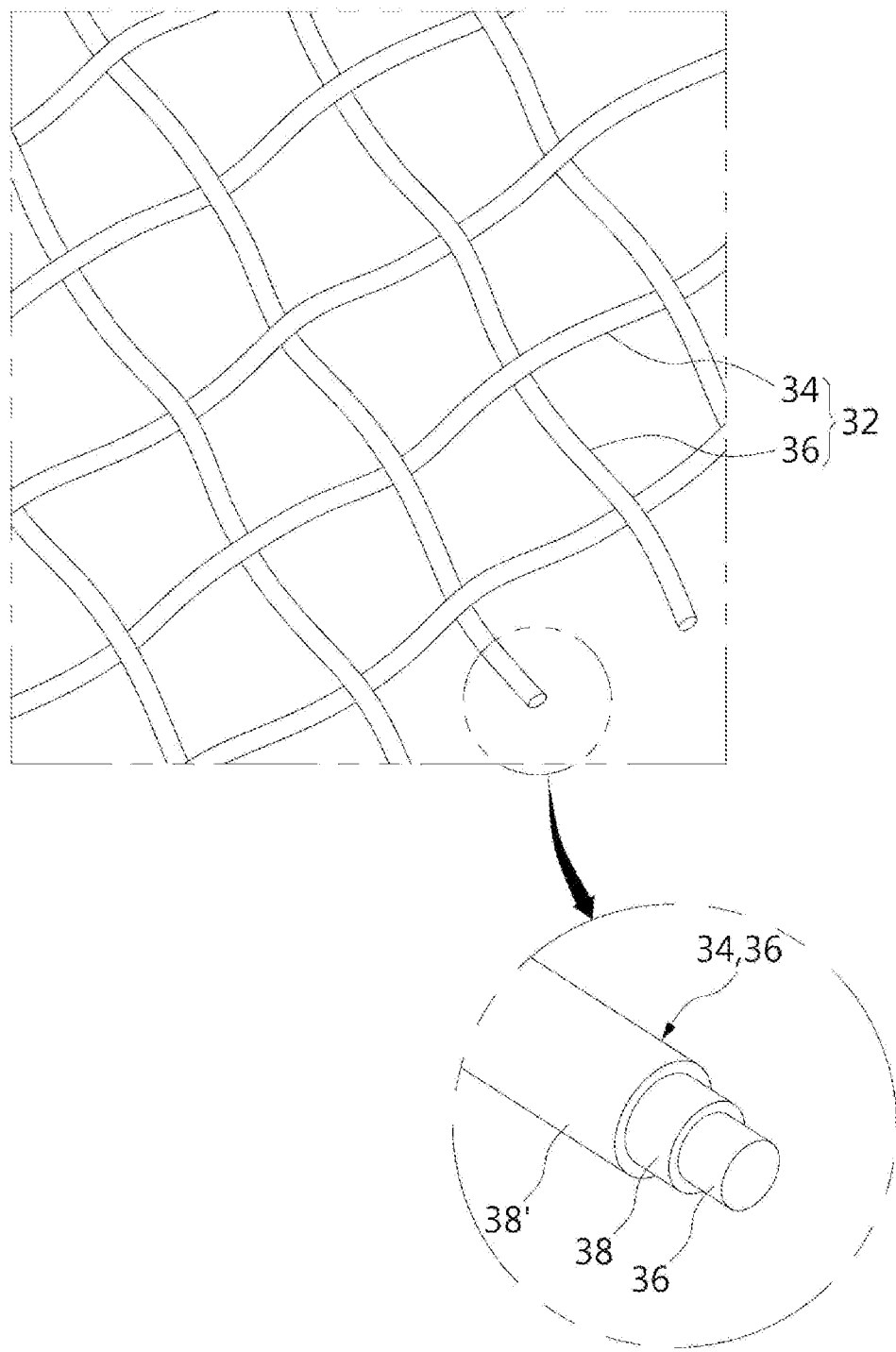
FIG. 3 is a perspective view and an enlarged view showing the constitution of conductive fibers for forming conductive layers in the embodiment of the present invention.

As shown in the enlarged view of FIG. 3, the wefts 34 and the warps 36 constituting the conductive fibers 32 are constituted by sequentially forming a first coating layer 38 and a second coating layer 38' on the outer side of a core wire 37. The first coating layer 38 includes copper or a copper alloy. The second coating layer 38' mainly includes nickel, and gold or silver may be used therein.

The thickness of the conductive fibers 32 is a value between 3 micrometers and 100 micrometers, and it is most preferable to use fibers having a thickness of about 10 to 30 micrometers in terms of ease of handling.

Next, filling layers 40 are formed between the insulating layers 20 wound around the outer side of the central conductor 10 and the conductive layers 30. Of course, the filling layers 40 are formed between the central conductor 10 and the insulating layers 20 and between the conductive layers 30 and the insulating layers 20 so as to surround both the insulating layers 20 and the conductive layers 30.

The filling layers 40 include an epoxy resin. The epoxy resin for forming the filling layers 40 may be mixed with an inorganic filler. Silica or alumina may be used as the inorganic filler. The inorganic filler is preferably mixed in an amount up to about 50 wt %. Of course, the inorganic filler may not be mixed, but is mixed in order to increase the insulating performance. In addition, the insulating performance is best in the case where 50 wt % of the inorganic filler is mixed with the epoxy resin.

The bushing having the above-described constitution according to the present invention is manufactured via the following process.

Figure 4:
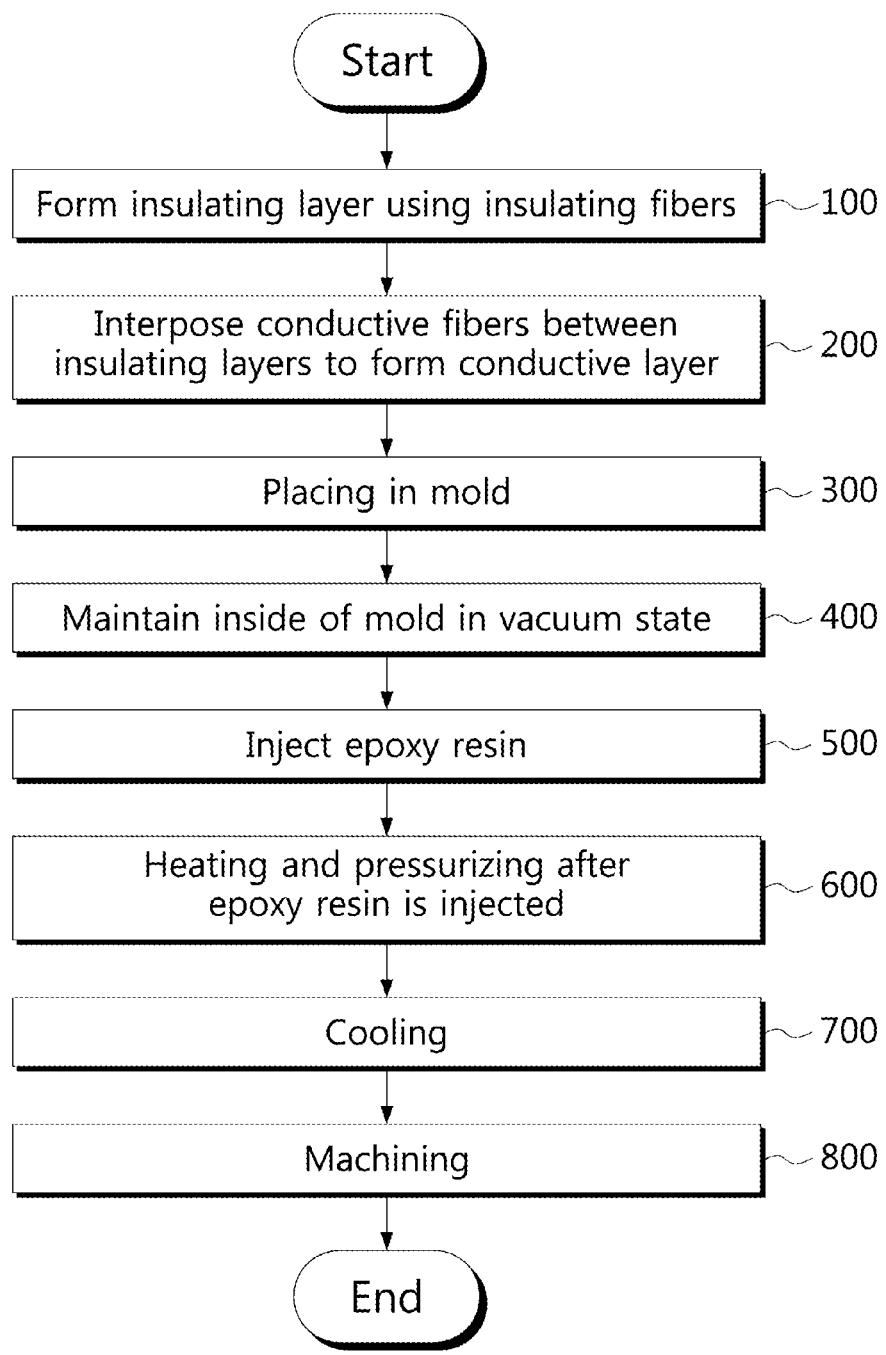
FIG. 4 is a flowchart showing a preferable embodiment of a method of manufacturing a capacitor bushing according to the present invention.

As shown in FIG. 4, first, the insulating synthetic fibers 22 are wound around the outer side of the central conductor 10 so as to form several layers (step 100). The synthetic fibers 22 form the insulating layers 20. The wefts 24 and the warps 26 constituting the synthetic fibers 22 are wound so as to be positioned obliquely with respect to the longitudinal direction of the central conductor 10 during winding of the synthetic fibers 22 around the central conductor 10.

The conductive layers 30 are formed between the insulating layers 20 formed using the synthetic fibers 22 during winding of the synthetic fibers 22. To this end, the conductive fibers 32 for forming the conductive layers 30 are positioned between the insulating layers 20 during formation of the insulating layers 20 (step 200). During interposition of the conductive layers 30 between the insulating layers 20, the wefts 34 and the warps 36 constituting the conductive fibers 32 extend obliquely with respect to the longitudinal direction of the central conductor 10.

The central conductor 10 around which the insulating synthetic fibers 22 and the conductive fibers 32 are wound is placed in a mold (step 300). The inside of the mold is maintained in a vacuum state (step 400). To this end, the cavity of the mold is allowed to communicate with a vacuum line, thus vacuumizing the cavity. The inside of the mold is maintained in a vacuum state as described above in order to prevent bubbles from being generated in the insulating layers 20, the conductive layers 30, and insulating layers 30, and between the layers.

The epoxy resin for forming the filling layers 40 is injected while the inside of the mold is maintained in a vacuum state (step 500). The epoxy resin for forming the filling layers 40 fills the inside of the mold and is then heated while being pressurized under a pressure of 3 to 5 bar using air pressure, thus curing the filler layers 40 (step 600). The epoxy resin is cured by heating under such a pressure, thereby preventing bubbles from being generated therein. The heating temperature of the epoxy resin is about 120 to 130° C. When the curing of the filler layers 40 is finished, cooling is performed (step 700). The cooling process may be performed in the mold or in a separate room.

Next, molding is performed using machining in a machine tool to obtain a desired shape (step 800). In addition, when a shed is required on the outer side, molding is performed while silicone rubber is inserted into the mold, thus forming the shed.

The description above is merely illustrative of the technical idea of the present invention, and various modifications and changes can be made by those skilled in the art without departing from the essential characteristics of the present invention. Therefore, the embodiments disclosed in the present invention are not intended to limit the technical idea of the present invention but to illustrate the present invention, and the scope of the technical idea of the present invention is not limited by the embodiments. The scope of the present invention should be construed as being covered by the scope of the appended claims, and all technical ideas falling within the scope of the claims should be construed as being included in the scope of the present invention.

The invention claimed is:

1. A capacitor bushing comprising:
   a central conductor having a predetermined length,
   insulating layers formed by winding insulating fibers around an outer side of the central conductor so that wefts and warps constituting the insulating fibers extend obliquely with respect to a longitudinal direction of the central conductor,
   conductive layers positioned between the insulating layers and including conductive fibers, and
   filling layers formed by filling spaces between the insulating layers and the central conductor, between the insulating layers, and between the insulating layers and the conductive layers with an epoxy resin.

2. The capacitor bushing of claim 1, wherein the conductive fibers include wefts and warps obtained by sequentially forming a first coating layer and a second coating layer on an outer side of an insulating core wire.

3. The capacitor bushing of claim 2, wherein the wefts and the warps of the insulating fibers and the conductive fibers are woven so as to form a circular or polygonal shape.

4. The capacitor bushing of claim 3, wherein the wefts and the warps of the insulating fibers and the conductive fibers are woven so as to form a hexagonal shape.

5. The capacitor bushing of claim 1, wherein the epoxy resin for forming the filling layers is mixed with 0 to 50 wt % of an inorganic filler.

6. The capacitor bushing of claim 5, wherein the inorganic filler is silica or alumina.

7. The capacitor bushing of claim 2, wherein the wefts and the warps constituting the conductive fibers are woven so as to extend obliquely with respect to the longitudinal direction of the central conductor.

8. A method of manufacturing a capacitor bushing, the method comprising:
- winding insulating fibers around an outer side of a central conductor to form insulating layers,
- interposing conductive fibers between the insulating layers to form conductive layers,
- positioning the central conductor, which has the insulating layers wound around the outer side thereof and the conductive layers interposed between the insulating layers, in a mold,
- injecting a material for forming filling layers while an inside of the mold is maintained in a vacuum state, thus forming the filling layers, and
- curing the filling layers by applying pressure and heat to the mold in a state in which injection of the material for forming the filling layers into the mold is finished in order to form the filling layers, wherein the insulating fibers are wound so that wefts and warps of the insulating fibers extend obliquely with respect to a longitudinal direction of the central conductor.

9. The method of claim 8, wherein the conductive fibers are wound so that wefts and warps of the conductive fibers extend obliquely with respect to the longitudinal direction of the central conductor.

10. The method of claim 8, wherein the material for forming the filling layers is an epoxy resin and an inorganic filler is mixed in an amount of 0 to 50 wt %.

11. The method of claim 8, further comprising:
- cooling the filling layers after the curing the filling layers.

* * * * *